United States Patent
Welsch

(10) Patent No.: US 10,834,736 B2
(45) Date of Patent: Nov. 10, 2020

(54) METHOD OF TRANSFERRING DATA BETWEEN VEHICLES

(71) Applicant: Aptiv Technologies Limited, St. Michael (BB)

(72) Inventor: Tim Welsch, Neustadt (DE)

(73) Assignee: Aptiv Technologies Limited, St. Michael (BB)

( * ) Notice: Subject to any disclaimer, the term of this patent is extended or adjusted under 35 U.S.C. 154(b) by 57 days.

(21) Appl. No.: 15/826,872

(22) Filed: Nov. 30, 2017

(65) Prior Publication Data

US 2018/0176930 A1  Jun. 21, 2018

(30) Foreign Application Priority Data

Dec. 19, 2016 (EP) ..................................... 16205144

(51) Int. Cl.
*H04W 72/12* (2009.01)
*H04W 4/02* (2018.01)
*H04W 84/00* (2009.01)

(52) U.S. Cl.
CPC ........... *H04W 72/12* (2013.01); *H04W 4/027* (2013.01); *H04W 72/1205* (2013.01); *H04W 84/005* (2013.01)

(58) Field of Classification Search
None
See application file for complete search history.

(56) References Cited

U.S. PATENT DOCUMENTS

| | | | |
|---|---|---|---|
| 9,635,110 B2 | 4/2017 | Engel et al. | |
| 2011/0112717 A1 | 5/2011 | Resner | |
| 2016/0003637 A1* | 1/2016 | Andersen | ................ G06F 16/29 701/519 |
| 2016/0050291 A1* | 2/2016 | Haug | .................... H04W 12/04 709/217 |
| 2017/0359696 A1* | 12/2017 | Yasuda | ................... H04W 4/08 |
| 2018/0035419 A1* | 2/2018 | Beattie, Jr. | .......... H04W 72/048 |

FOREIGN PATENT DOCUMENTS

CN         105308663 A       2/2016

OTHER PUBLICATIONS

"Extended European Search Report", EP Application No. 16205144.5, dated Jun. 19, 2017, 6 pages.
"Foreign Office Action", EP Application No. 16205144.5, dated Apr. 23, 2020, 4 pages.
"Foreign Office Action", CN Application No. 201711364836.X, dated Jun. 12, 2020, 7 pages.
"Foreign Office Action", CN Application No. 20711364836.X, dated Nov. 26, 2019, 13 pages.

* cited by examiner

*Primary Examiner* — Ayaz R Sheikh
*Assistant Examiner* — Sori A Aga
(74) *Attorney, Agent, or Firm* — Colby Nipper PLLC

(57) ABSTRACT

A method for determining a time for scheduling wireless transfer of payload data to a first vehicle from a second vehicle. The method includes the steps of: a) providing a movement profile for each of the of vehicles; b) comparing the movement profiles; and c) dependent on the outcome of step b) determining a one or more suitable scheduling times when the vehicles are likely to be in requisite wireless proximity for the payload data transfer.

21 Claims, 4 Drawing Sheets

METHOD OF TRANSFERRING DATA BETWEEN VEHICLES

CROSS-REFERENCE TO RELATED APPLICATION

This application claims the benefit under 35 U.S.C. § 119(a) of European Patent Application EP 16205144.5, filed Dec. 19, 2016, the entire disclosure of which is hereby incorporated herein by reference.

TECHNICAL FIELD OF INVENTION

This invention relates to a method and system of transferring payload data from a first vehicle to a second vehicle; and to a method of determining and scheduling times for such transfer.

BACKGROUND OF INVENTION

Modern vehicles are often equipped with various computer, information, entertainment, navigations systems and such like. Such systems require downloading of large amounts of data. The data may be ECU data or other vehicle system data, or data relating to entertainment systems (films, music etc.), as well navigation systems and map data. Such data also includes collected sensor data from the vehicle to improve maps for automated driving. Such data also includes update data for these systems. Typically, these data are downloaded via remote server systems (often known as "IT backbone"). So, for example, this is required to update the vehicle system software, or to update user data, like digital maps or to update consumer data like videos, music, and newspaper and pictures etc. Some computer systems also collect large amounts of data from the vehicle or users associated therewith, that must be transferred to remote server systems to process and analyze those data. All such data can be referred to as "payload data", and the term "payload data" should be interpreted hereinafter as such.

In vehicles, on-board computer systems are inherently mobile (or quasi-stationary only) and typically have no low-cost data connection to the Internet that is used usually for such data transfer in other applications. Instead they must use widely and permanent available networks, mostly the commercial public mobile network or commercial WLAN hotspots. This is typically done for vehicles with electronic control units (ECUs, computer systems), especially for personal vehicles, construction/heavy duty and other commercial vehicles.

Alternative to the public network usage there are methods that using physical storage devices, which can be connected manually and temporarily to the vehicle computer systems to allow requisite data exchange of payload data. However, there are implicit and obvious problems with manually updating and inputting data via physical storage devices.

As mentioned, using the public network infrastructure means additional cost for the data transfer. The offered or usable data rate of such public networks often is significant low compared to amount of payload data exchange needed, resulting in a very long connection times or the need to execute multiple partial exchanges. Moreover, the availability of the public networks cannot be guaranteed everywhere resulting in the case that for some of vehicle based computer systems, the network access and therefore the data exchange cannot be planned or even guaranteed ever. For efficient computer system operation, the mandatory data exchange cannot be guaranteed for all systems. The widely-used user smartphones face a similar situation, but most users pay a reasonable fee for a proper connection to the mobile data network and is additionally daily 2-3 times within the coverage of a private WLAN that allows updates without additional cost.

To overcome these problems, methods have been developed for Least-Cost-Routing (LCR), e.g. switching between Mobile vs. WLAN and controlling/blocking high data amounts when using expensive services. However, this is not ideal. As mentioned other methods include basing updates on physical storage media like USB-Stick or SD card; exchange of the complete computer system (ECU) with an updated one; using end user smartphone as temporary storage, but this is not ideal.

Although there is an ongoing increase of mobile network's capability, nevertheless the demand on the data amount to be exchanged also increases in same manner. For example, vehicle computing systems are planned with 128 GB internal flash memory for series production; video media for home entertainment uses meanwhile 4 k-HD resolution and/or 3D content.

It is an object to overcome such problems and to provide a system and method to transfer or exchange payload data to a vehicle system in a cost-effective manner, which minimizes the use of public and other networks, such as Internet and cloud access, and thus mitigates the cost and limitations thereof.

SUMMARY OF THE INVENTION

In one aspect is provided a method for determining a time for scheduling wireless transfer of payload data to a first vehicle from a second vehicle comprising the steps of: a) providing a movement profile for each of said of vehicles;

b) comparing said movement profiles; c) dependent on the outcome of step b) determining a one or more suitable scheduling times when said vehicles are likely to be in requisite wireless proximity for said payload data transfer.

Step b) may comprise processing said movement profiles in conjunction with one another.

Said second vehicle may be selected by comparing the movement profiles of a plurality of vehicles possessing said payload data, with the movement profile of said first vehicle, and concluding a match between said first and second vehicle, said match being the result of step b) in that it is determined in that second vehicle is likely to be in sufficient wireless proximity with said first vehicle at one or more future times.

One or more of the movement profiles may comprise or may be derived from, vehicle geographical/positional data correlated with time.

One or more of the movement profiles may be derived from the GNSS/GPS system of the vehicle.

One or more of said movement profiles may include one or more scheduled or possible attendance at events or appointments.

One or more of the movement profiles may comprise or include an event name or identifier One or more of the movement profiles may comprise or includes an appointment location and time.

Data of one or more of the movement profiles may be derived from an electronic calendar or diary.

One or more of the movement profiles may be derived from a social media or forum website accessed by a person associated with the relevant vehicle.

One of more of the movement profiles may be derived from or obtained via a personal device associated with a person associated with the vehicle.

The comparison in step b) may include determining temporal patterns of one or more of said movement profiles.

Steps b) may comprise, from said movement profiles, determining distance between the two vehicles against time, and step c) comprises determining likely times where said distance is at a minimum or within sufficient wireless proximity.

The comparison in step b) may include determining temporal patterns in the distance between the two vehicles against time.

Said movement profile data is forwarded to a central or remote entity and steps b) and c) are performed by the entity.

Said scheduling data or movement profiles data are sent or received by said vehicles, via a personal device associated with a person associated with said vehicle.

Raw movement profile data may be further processed to provide refined movement profile data.

In a further aspect is provided a processor adapted to determine a time for scheduling wireless transfer of payload data to a first vehicle from a second vehicle, being adapted compare movement profiles of said vehicles to determine one or more suitable scheduling times for said transfer when said vehicles are likely to be in requisite wireless proximity for said payload data transfer.

One or more of the movement profiles may comprises or may be derived from, vehicle geographical/positional data correlated with time.

One or more of said movement profiles may include one or more scheduled or possible attendance at events or appointments.

One or more of the movement profiles may comprise or may include event name or identifier One or more of the movement profiles may comprise or include an appointment location and time.

The processor may be adapted to determine the distance between the two vehicles against time, from said movement profiles and determine therefrom likely times where said distance is at a minimum or within sufficient wireless proximity.

The processor may be adapted to determine temporal patterns of one or more of said movement profiles or between said movement profiles.

BRIEF DESCRIPTION OF DRAWINGS

The present invention is now described by way of example with reference to the accompanying drawings in which.

DETAILED DESCRIPTION

Figure 1:
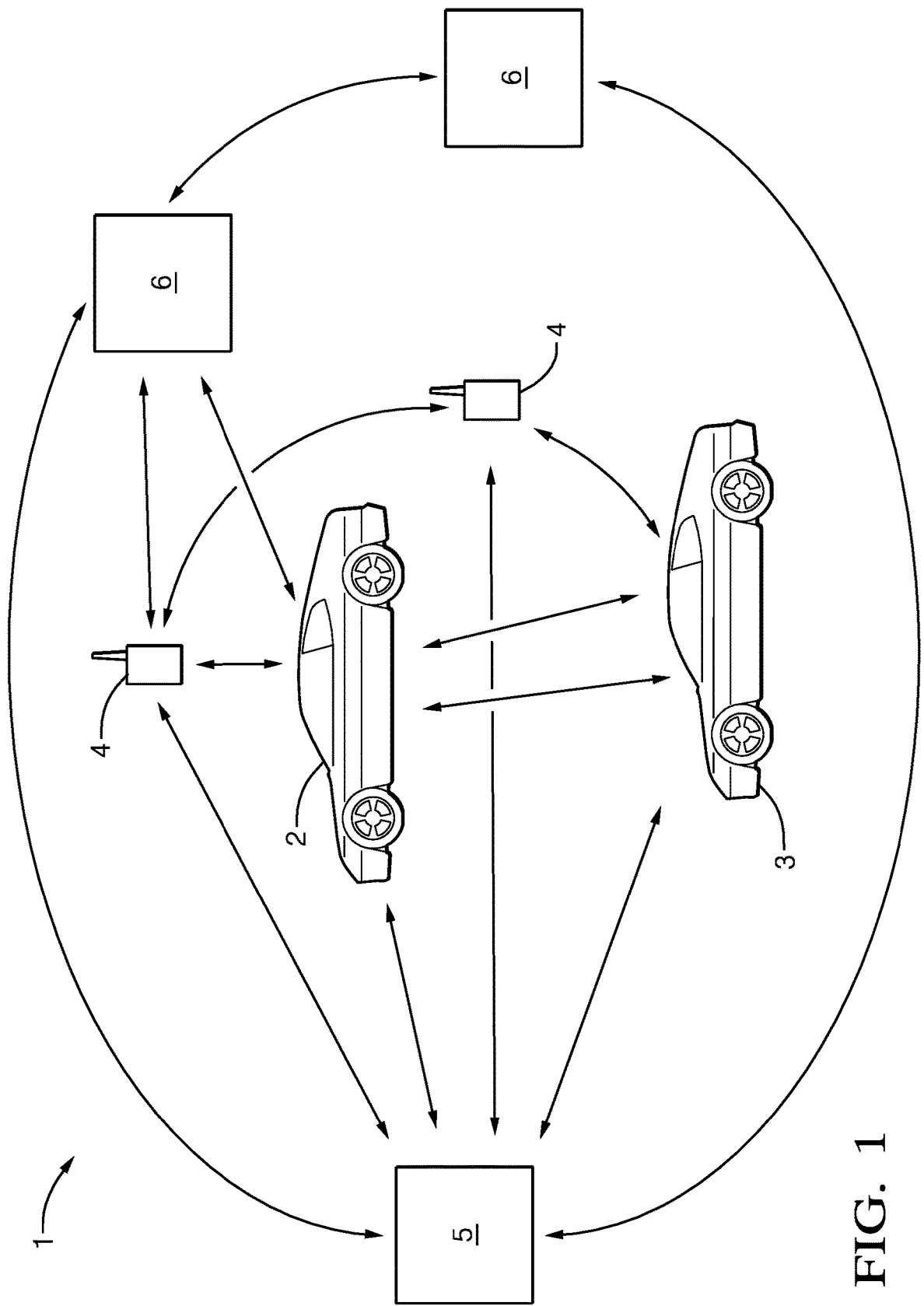
FIG. 1 shows a schematic diagram of a communication system that can be used in conjunction with embodiments of the invention.

The above problems are solved in one aspect by providing a method and system which allows payload data possessed by one vehicle to be transferred to another vehicle which requires the payload data. In aspects, this can be performed by equipping vehicles with transmitter and/or receive means such that payload data can be transmitted from one vehicle and to another. Aspects of the invention provide predictive methodology to schedule such data transfer at times when the vehicles are likely to be in requisite proximity for wireless transfer of data, from movement profiles of the vehicles. So, in examples of the invention, vehicles which have one or more computer systems which require data transfer (e.g. downloading) of payload data are provided with transmitting and/or receiving means to transmit or receive such data to or from other vehicles with similar systems. In other words, rather than receive data directly from public networks, WLANs and such like, data is received from another vehicle which possesses the data. Data may be transferred directly between vehicle systems or via personal devices associated with the vehicle. The method determines movement profiles of vehicles and analyses them to determine scheduling times for such payload data transfer Aspect therefor provide the use of intelligent autonomous transceiver- and distribution system for payload data exchange utilizing methods for pre-arranged data communication events between a vehicle computer systems and either another vehicle computer system to transfer payload data.

According to examples of the invention, systems and methodology predict when a vehicle is likely to be in (sufficient) proximity with another vehicle, so that data exchange can take place wirelessly. Furthermore, the systems and methodology according to examples may determine the length of times the vehicles are in sufficient proximity.

This can be achieved according to examples by effectively providing, for each of a plurality of vehicles, a "movement profile" which will be explained in more detail hereinafter. By analyzing (e.g. matching or comparing) movement profiles of vehicles, it can be determined when the vehicles are likely to be in requisite proximity for payload transfer to take place, and thus scheduling times can be determined. Thus in particular embodiments, the methodology determines a movement profile for two or more vehicles and determines the probabilities that the vehicles are in requisite proximity at various times, and sets scheduled times for data transfer when the vehicles are likely to be in proximity.

To illustrate this, an example will be given. If two vehicles users use the same car park, e.g. a railway station carpark, and the vehicles are left by the owners during the weekdays regularly at the same car park (e.g. for the same or overlapping times) then the system will determine that at such times, payload data can be exchanged between them. So, for example, if one vehicle has the latest update data for a navigation/map system and the other vehicle does not, whilst the vehicles are in the same car park, the vehicle with the updated/full data can transmit the updated data to the vehicle that requires the update.

Thus, in examples the methodology determines movement profiles of vehicles and matches them with movement profiles of other vehicles, to determine likely times when they are in sufficient proximity for wireless data transfer. In this way, the matching determines the likely times (and optionally the amount of time) the vehicles are in sufficient proximity to exchange (transmit and or receive) payload data.

In one example, the movement profiles determine temporal patterns of movement of vehicles. In an example, the movement profiles provide/comprise data on locations and times of vehicles (i.e. a time/location plot), and predicts likely position of a vehicles at a particular time in the future. This may be performed by looking at temporal patterns (e.g. patterns in respect to time of the day, day of the week, monthly or other patterns or combination thereof. Movement profiles of a plurality of vehicles can then be compared or processed together to determine suitable (future) scheduling times when the vehicles are likely to be in requisite proximity. This may be implemented by computing the physical distance between vehicles over time scales and looking at temporal patterns to determine predict likely times when they are sufficient close for wireless data transfer. This will be explained in more detail hereinafter In examples, the raw data to provide/determine and formulate movement profiles can be provided from vehicle position data against time, e.g. from a vehicle GPS system, which will give location against time. Alternatively, the same data can be determined from other means such as tracking a mobile device associated with the vehicle. This will be described in more detail hereinafter. Raw movement profile data such as geographical location against time may be refined further to provide refined movement profiles.

In other examples, movement profiles may be formulated from data from other sources. For example, data may be obtained from social media such as Facebook. If it is determined that the owners of two vehicles are going to a (i.e. the same) event, e.g. a concert, car show, (possibly inherently on the same date), then this information can be used in methodology to provide a basic movement profile (comprising in this example merely the intention to attend or possible attendance of a specific event). This basic movement profile can then be compared to (basic or refined) movement profiles of other vehicles to determine if and when likely that the vehicle and another vehicle will be in proximity on the day of the event, and determine this is a suitable time for payload data to be exchanged i.e. data to be transferred from one vehicle to another.

It is to be noted that for exchange of data to take place the vehicle does not need to be occupied or running. Two stationary cars left by the owners in a car park can exchange data by suitable power management and scheduling. The vehicles respectively their data and transfer systems may be kept in a sleep mode state and activated at a (i.e. the scheduled) time, or at one or more times (intervals) the vehicle systems may be activated. This can be done in several ways by one of the vehicles sending out at particular time(s), a signal to the other vehicle to activate it or to see if it is activated. Such schemes are well known in the art and will not be described in too much detail here.

System

FIG. 1 shows a schematic diagram of a system according to one example. The figure shows a first vehicle 2 and a second vehicle 3. The vehicles are adapted (i.e. have means on board) to transfer data to or from one of the vehicles, to the other, in a wireless fashion—generally therefore the vehicles are equipped with transceiver means. Such wireless communication may be via any scheme such as Bluetooth, WLAN, etc. The vehicle hardware will be described in more detail hereinafter. Such data may be system data or update data relating to any of the vehicle systems, or entertainment data such as music and films, or data such as map updates. As mentioned these data can be referred to as payload data. Additionally, movement profile data or scheduling data may be transferred between vehicle systems wirelessly. The vehicles may thus possess means to receive and/or transmit any payload or movement profile data to another vehicle or other component of the system. Such vehicle transceiver means can be connected to the vehicles other systems and have associated memory storage and processing functionality.

In addition, the vehicles may be equipped with GPS systems. In this way, they can record the movement of the vehicle over time, i.e. plot the location against time. In this way, raw movement profile data such as time and geographical location can be provided. This raw data can be considered a basic movement profile or the data may by further process by any of the components of the system to provide more refined movement profile.

The vehicles may have means to communicate with personal devices 4 associated with the vehicles, e.g. belonging to the drivers or passengers of the vehicles (i.e. person associated with the vehicle). These may include portable devices such as e.g. laptops, mobile phones, tablets which can be carried on board. Alternatively, the associated personal devices may be non-portable devices such as home computers. The communication between the vehicle system and such personal devices may be wireless, or via wired connections, when e.g. mobiles or laptops or appropriate mobile devices are suitably physically connected to the vehicle systems (e.g. by socket/physical connection means).

Personal devices 4 associated with one vehicle 2 can communicate with another vehicle 3 system (wirelessly) or with personal devices 4 associated with that other vehicle. Any data (payload data or movement profile data) can thus be transferred from one vehicle to another vehicle via any one or both personal devices of respective vehicles.

The vehicles or their associated personal devices can communicate with a remote or central entity 5 (such as a server/processor/cloud), or one or more fixed nodes 6. Such communication is generally wireless e.g. via existing wireless (e.g. mobile WLAN). Alternatively, in the case that the personal device 4 associated with the vehicle is a home computer, the device may connect and communicate with the fixed (standard, ISDN, . . . ) networks fixed nodes or remote/central entity via standard telecommunication networks using the Internet, WLAN, fixed networks and such like. Such communication connections are particularly advantageous in transferring movement profile data and scheduling data to and from components of the system—this data is substantially less than payload data and hence, although in examples payload data is generally transferred from one vehicle to another directly, movement profile data and scheduling data may originate from any components of FIG. 1 and/or be transferred to any other component via the communication routes shown by the arrows in the figure, including via one or more of any other component.

The fixed nodes 6 and the central/remote entity may include memory (storage) means to store any data (e.g. movement profiles, payload data for transfer between the vehicles, or movement profile data or scheduling data). They may include processing means e.g. to process movement profile data to determine scheduling times for payload data transfer between two or more vehicles, and/or to processing raw movement profile data to provide refined movement profiles therefrom. So, the central/remote entity of or fixed node may process the movement profile data to provide possible e.g. scheduling times where two vehicles are likely to be in sufficient proximity for data transfer. Thus, this process may be performed by comparing the movement profile data of vehicles, determining patterns, or otherwise compute scheduling g (e.g. times) for transfer of payload data between vehicles (when the vehicles are likely to be in proximity). Detailed methodology will be explained hereinafter As mentioned personal devices 4 may also communicate with the remote or central entity 5 as well as the fixed nodes 6. This communication can be via wireless of non-wireless means and may incorporate known telecommunications systems such as cellular networks or fived landline systems, WLANs or the Internet.

In addition, any data (payload data but more specifically movement profile or scheduling data) can be transferred between one or more fixed nodes, or between the central processor and fixed nodes wirelessly or directly, and via any of the systems mentioned in the previous paragraph.

So, to recap, any of the component of the system of FIG. 1, so any of: central/remote entity 5, fixed (static) node 6, vehicles 2, 3; personal device 4, may forward any type of data to any respective component from the same list. This includes payload data or movement profile data or scheduling data. In particular advantageous examples, movement profile data (whether raw or processed) and scheduling data may be sent to or from any combination of these devices. Preferably movement profile data is forwarded to the central/remote entity where it is processed to provide scheduling times which is sent to other component of the system, directly or indirectly.

In addition, any of the functionality of comparing/processing/matching movement profiles to determine scheduling periods or times where vehicles are likely to be in requisite proximity for payload data transfer can be performed by any of these components. As mentioned, preferably such processing is performed by the central/remote entity to save processing and storage requirement of the other components of the system, and the central/remote entity determines scheduling times and forwards these scheduling times to the other components such as the vehicles or associated personal devices (either directly of via fixed nodes, other vehicles or any personal device of the system).

Scheduling times are thus preferably determined and sent from central/remote server to the vehicle (via where appropriate, the persona devices and/or fixed nodes). Again, scheduling times (or movement profile data) can be sent this way using a variety of public or private, wireless or fixed networks such as cellular phone networks, fixed line networks, LANs, WLANs, Internet and such like.

As mentioned, the vehicles may be equipped with GPS systems. In this way, they can record the movement of the vehicle, i.e. plot the location against time. So, this may provide raw data such as time and geographical location. This raw data can be considered a basic movement profile or the data may by further processed by any of the components of the system to provide more refined movement profile. In alternative method, the personal device associated with the vehicles may provide movement data of the vehicle. Mobile devices positions can be tracked by known methodology or may have bespoke in-built GPS systems. So, movement profile data (whether raw or processed) may typically be provided originating from the vehicle GPS systems but not limited to this. These raw movement profile data may be processed by the vehicle system to provide refined movement profile data. Either the processed or raw data may be sent directly to any other components of the systems such as stationary nodes, central/remote entity to or to other vehicles or their associated personal devices. Alternatively, this data may be transferred to these components indirectly via any of the components. In preferred examples movement profile data (preferably raw movement profile data) may be sent from the vehicle via any of the other component to the central/remote entity. The movement profile data (whether raw or refined) can thus be processed centrally along with that from other vehicles e.g. to refine the movement profile data and/or process such data with movement profile data of other vehicles to determine scheduling times.

Movement profile data may be sent from the first vehicle to the second vehicles (or fixed node/central processor) via the personal device and the device associated with another vehicle. In other words, movement profile data originating from the vehicle may be sent to the other vehicle or the central/remote entity or stationary node via the personal device associated with the first vehicle and/or the second vehicle. Movement profile data may be sent from the vehicle to the first associated personal device, and then from the personal to the second personal device associated with the second vehicle, and then further to the vehicle system or indeed any of the central/remote or static nodes.

Generally, as mentioned, in addition the data that is scheduled to be transferred can equally be transferred from any component to any other component, optionally via one or more other components.

It is to be noted that although typically raw movement profile data with respect to a vehicle would be originate from the vehicle itself, this may not always be the case. As mentioned an on board personal device such as a mobile device like a mobile phone tablet or laptop, may have means to allow the position thereof to be tracked, and consequently when carried aboard the vehicle, allows data pertaining to the consequential movement of the vehicle to be produced.

In other examples, movement profile data whether raw or processed can originate from any component of the system of FIG. 1. In particular, one or more personal devices associated with the vehicle maybe the source of the movement profile such as data pertaining to a planned, intended or possible attendance at an event (inherently at a particular location) or an appointment at a particular location. Such data can be gleaned from social media websites (e.g. Facebook) or electronic calendar/diary systems (such as Microsoft Outlook) and forwarded form the personal devices associated with the vehicle, as will be explained in more detail hereinafter. Typically, therefore, this form of movement profile data can be transferred to any component of the system and in preferred embodiments is transferred to a central/remote entity, either directly or via standard wireless or fixed communication networks such as mobile telephone networks LANs, WLANs, fixed telephone networks and suchlike. Alternatively, such data can be transferred from the personal device to the central processor/server via one or more of the vehicles systems, personal devices associated with other vehicles, and fixed links.

As mentioned and to recap, any of the functionality of the method can be performed in any component of the system. So, in other words the processing of raw movement profile data for a particular vehicle to provide refined movement profile can be performed by any vehicle system, personal device, of any of the vehicles or the central/remote entity or static/fixed node. Likewise, comparison and processing of movement profiles, and determining, scheduling times for data transfer can also be done by any other of these components, e.g. likely.

Once the movement profiles have been processed to determine scheduling times where the vehicles are likely to be in requisite range, the scheduling data, which may comprise of one or more times or timeslots (e.g. when the vehicles are likely to be in sufficient proximity for wireless transfer of payload data), may be sent to the appropriate vehicles from any component of the system to any other component of the system optionally via one or more any further components of the system. Where scheduling data is computed by the central/remote entity, this can be forwarded to the vehicles systems directly (obviously if there is wireless capability between the two) or via the personal devices and/or fixed nodes. The scheduling times may be further relayed form one vehicle to another vehicle (directly or via the fixed node or personal devices)

Vehicle Hardware

Figure 2:
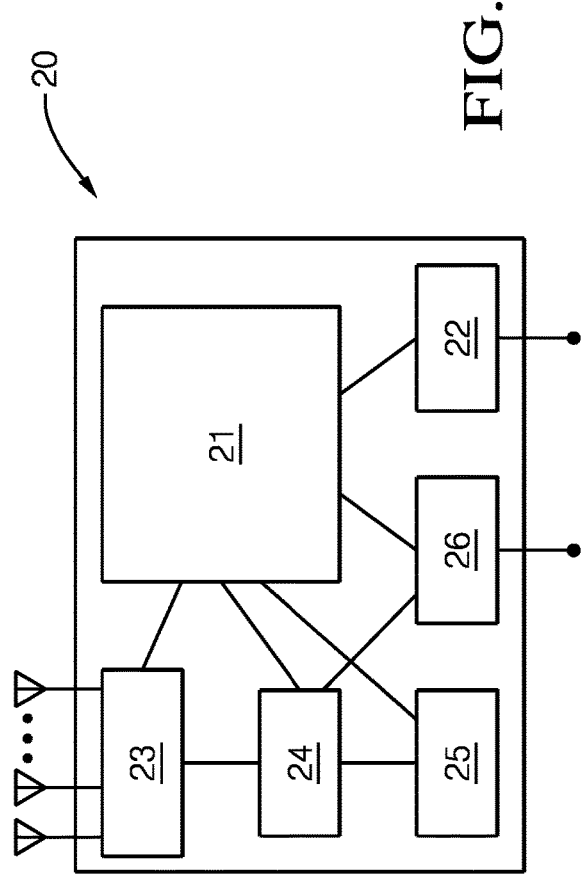
FIG. 2 shows a schematic diagram of on-board vehicle hardware that can be used in examples of the invention.

An example of on-board vehicle hardware which can be used in examples of the invention will now be described with reference to FIG. 2. FIG. 2 shows a system 20 located on board a vehicle which implements methodology according to examples. The core of the device system, is an (e.g. autonomous) task management unit 21 for management of data exchange tasks, and which implements the appropriate methodology. This could be regarded as a Mobile-Cloudbox, MCB, the unit 20 may have a power supply unit 22, which is connected to the vehicle power supply/battery. The task management unit 21 may control the power, activation of the system, as well as payload data transfer, as will be described.

The unit 21 is connected to a radio block unit 23, which includes transmitter and/or receiver means (e.g. a transceiver unit) allowing wireless communication with other (e.g. similar) computer systems in other vehicles (or associated personal devices) when in sufficient (e.g. short) range to exchange data, as well as any component of the system of FIG. 1. So, the system 20 may also communicate/be connected with a mobile network modem. A data manager 24 is provided adapted to organize the storage and aggregation of received data within the storage memory 25 and/or organize the transmission of data packets (of e.g. payload data) towards remote receiving units on other vehicles. The system 20 may also include an interface 26 connected to other systems of the vehicle such as the ECU/entertainment system/GPS system and such like such that payload data can be transferred to or from these systems, or movement profile data (e.g. from a GPS system) can be transmitted.

In operation in one example, the system will awake from power down/sleep mode for payload data transmission or reception (exchange) at a pre-arranged i.e. scheduled time. These data may be payload data but also movement profile data. Thus, the system 20 will establish contact with data sources or sinks (e.g. of payload data), such as similar systems 20 in other vehicles or personal (e.g. mobile/portable) devices 4, that are in wireless range. This includes similar systems on other vehicles or static/stationary nodes. After the task is done, the system falls back into a power down/sleep mode. Any wireless transmission scheme may be used such as an RF systems (e.g. Bluetooth/WLAN).

The system 20 may also be connected to vehicles navigation (e.g. GPS system). In this way, the system 20 may formulate a movement profile by collecting data pertaining to the vehicles position and time. Furthermore, the system 20 may process this raw data to provide a refined movement profile or determine patterns from the movement profile. The system may also receive movement profiles of other vehicles from the vehicle themselves or any other component of the system of FIG. 1. Methodology according to aspect of the invention can be implemented in the task management unit 21.

Known methods of (e.g. payload) data exchange in separate portions/packets may be included in the task management (collaborative data exchange, bit-torrent, etc.) to optimize data exchange at increased data volumes when the mobility of the communication party (e.g. vehicles) is high (location and time varies often and allows only short communication). By using a local wired interface 22, the system can exchange data with the vehicle in which it is installed. In this way, the system 20 can be connected wirelessly or physically (via connector means) to one or more personal devices associated with the vehicle.

As far as system 20 is concerned, it can be mounted on the vehicle and supplied with power from the vehicle. The system 21 may operate according to any appropriate wireless communication standard, such as 2G, 3G, LTE, 5G, etc. and may cover WLAN in Client- and AP-Mode, parallel. The system may cover BlueTooth (BT) with all variants (Low-Energy-BT, etc. as well as GPS, C2C, V2X, and such like.

Preferably the system has sufficient mass storage capability (flash, SSD, HDD). The system 20 can be adapted to enter a power down mode/deep sleep. Optionally the system can determine the (vehicle) battery status and arrange the communication strategy accordingly. The system can wake up autonomously based on such a strategy using time and/or location or scheduling data. The systems can accept remote tasks for data exchanges (from Cloud or vehicle management systems).

Detailed Aspect of Examples of Methodology

Movement Profile

In one aspect, a movement profile of a plurality of vehicles is formulated. In one aspect, in order to provide this, data relating to position and time may be determined or collected with respect to that vehicle. This may be performed using the vehicle navigation system, (e.g. GPS) and a reference clock. So, in essence, the movement profile may comprise such raw data pertaining to geographical vehicle position and time. The movement profile may thus comprise such data or be formulated from such data. Alternatively, such data can be provided from a mobile personal device associated with the vehicle—this may be obtained from the mobile device itself or from any system which can track the mobile device, for example mobile phone networks allow the positions of mobile phones to be determined.

Alternatively, a (refined) movement profile may be formulated from processed raw data (such as position and time) to provide a more advanced movement profile comprising refined (higher level) data. Such a processed movement profile may contain information such as pertaining to likelihood that the vehicle will be at a certain area, in the vicinity of a particular location, at a particular future time(s). The formulation of the refined movement profile data may be performed by the unit 20 or any component of the system of FIG. 1. In preferred embodiments, raw profile data is sent to the central/remote entity or fixed node for processing to produce refined movement profiles; in other words, alternatively, raw data collected by a vehicle may be forwarded e.g. wirelessly to a central/remote entity, or to other vehicles, which may formulate the movement profile from raw data.

Whether the movement profile comprises raw or processed data, participating can vehicles share their movement profiles with other vehicles, fixed nodes or the central/remote entity, optionally via personal devices.

So, a movement profile may, in a basic form, may contain as well as a unique node (ECU/vehicle) identifier, a list of geographical positions (GPS/latitude-longitude) with a timestamp. New movement data, in terms of location and time, can be added to the vehicles movement profile continuously, and older (e.g. outdated) movement data can be removed from the profile continuously. As mentioned such data may be processed to provide higher level movement profile such as likely locations at certain times; e.g. times of the day, week or month, days of the week or month or any other temporal data indicating likely position at any temporal variable.

In preferred examples to provide simple processing of the profiles, an interpolation can prepare profiles with same time base, e.g. steps of 1 minute.

In alternative examples the movement profile can comprise higher level data such as a future specific location and time. Thus, in examples, the movement profile data may comprise a place and a time the vehicle is likely to be there—e.g. effectively a pre-scheduled or putative appointment, e.g. direct information such as a pre-arranged appointment at a particular pace. So, the movement profile may be in examples: Tuesday 29th June 10 am to 4 pm at Puttenham Golf Course Car Park or any Tuesday at Puttenham Golf Course Car Park. Thus, there may be provided specific or general times in such a movement profile and there may be more than one time listed with the geographical location. The movement profile may optionally indicate for those times, the likely timeslot (duration) that the vehicle will be at the location Alternatively, the movement profile may comprise merely a specific event (where the time and place is inherent). So, for example the event may be Farnham Book Festival. This inherently takes place at a particular location (Farnham Maltings Building) between 11 am and 4 pm on a certain date, e.g. 4 October. Such movement profiles can be formulated or comprise data from various sources. The system may collect data from social media (e.g. Facebook), Web pages, Internet forums, computerized diary and calendar systems such as Microsoft Outlook, or emails in order to formula the movement profile, as will be described later.

If the vehicle user has indicated (on a e.g. social media such as Facebook page or Internet forum) that he is likely to attend a particular event, this data can be used to produce a movement profile. So, an indication that owner of vehicle A on a Facebook displayed event will attend or possibly attend the event, can be used as movement profile data, and sent e.g. from the personal device 4 to any component of the system of FIG. 1. So, the movement profile in this case may comprise in the simplest form, the fact that a specific event is indicated. The time and/or place of the event is inherent, and can be determined by any component of the overall system. Thus, from this movement profile data the geographical location and times of the event can be determined. This can be compared and processed with any type of movement profiles of other vehicles to see if there are possible scheduling times where the vehicles are likely to be in requisite proximity. The movement profile can be processed to indicates that there is a high chance that on the date of the event, the vehicle will be at the location of the event and that at times during the event, the vehicle can receive or transmit data to other vehicles, whose movement profiles also suggest that they will be in the vicinity at such times of the event (e.g. both vehicles in the Farnham Maltings car park during the Book Festival). So it should be understood that the term "movement profile" also can comprise an event and not comprise explicit time or location data—this is inherently matched. The term "movement profile" should be thus interpreted as such.

In a further example, as mentioned briefly, data from computer based calendar or diary systems can be used to glean information regarding pre-planned (likely future) appointments at a particular place and provide a movement profile, essentially comprising a place/location and a time or timespan. If for example the driver of a vehicle A has a meeting/appointment at office B on a particular date booked on a computerized diary/calendar system, again such information may be used according to methodology to provide a movement profile of the driver/owner of the vehicle. The movement profile in this case is a timespan and a location/place. The timespan may be over any appropriate timespan e.g. 10 am to 11 am, and the location may be listed as just a name such as Regal Bakeries or Cedar Dental Practice or Head Office of Shock Monkey Entertainment. Such name data can be refined (e.g. later by the central/remote processing unit for example) to a geographical location. So, such data can be transferred to the remote or central entity for processing or forwarding to other vehicles from mobile phones, laptops home based computers or indeed any portable or fixed computer terminal, by the routes explained above with respect to FIG. 1.

Raw movement profile data may also be processed to look at temporal patterns of location of the vehicle. For example, the location/time data may indicate that a vehicle tends to park at a particular location (e.g. in a particular railway station car park) Mondays to Fridays from 7 am to 6 pm. Such patterns can be determined to provide probable chances that a vehicle will be at a location at a point in the future and be available to schedule data transfer at that time. Such methodology may implemented in the ECU or the task management or alternative in these system of other vehicles, or preferably by the remote entity (server or processor). Thus, as far as location is concerned, movement profile data may include associated with the location, a specific time/data or any general temporal pattern when the vehicle is likely to be there so Monday to Wednesdays 10 am to 5 pm, first Saturday every month 10 am to 11.30 am, 2nd week of July all week, etc.

Determining Scheduling (Payload Transfer) Times from Movement Profiles

Once movement profiles have been formulated (comprising raw or processed data) they are compared or processed with one or more movement profiles with respect to other vehicles, to provide and schedule any suitable times for payload data transfer from one vehicle to another to be determined. So, in other words movement profiles for a plurality of vehicles are processed in order to determine times or time slots where the vehicles are likely to be in requisite proximity for payload data transfer to take place. So the movement profiles of two or more (preferably all participating vehicles) nodes are processed e.g. by comparison, to determine scheduling times. When considering the comparison of movement profiles of two vehicles, this can be regarded as generally analyzing the two movement profiles in conjunction (e.g. matching the profiles) to determine if there any scheduling times when the vehicles are likely to be in requisite proximity at times/timeslots of the invention. This may include processing the two movement profiles to produce data reflective of the distance between the two vehicles with time. The term "comparing" in examples may include determining temporal patterns in the movement profiles (and any appropriate matching) to determine when the vehicles are likely to be in requisite wireless proximity for payload data transfer, including e.g. determining temporal patters in the distance between the vehicles as determined form the movement profiles. Thus the term "comparing" should be regarded as such and includes processing the movement profiles together.

In order to determine such scheduling times, in aspects various comparison processes may be performed, and these will now be described in more detail. Of course the methodology is not limited to the comparison processes described and the skilled person would readily be aware of alternative comparison or other processing which yields information pertaining to possible times for data transfer (when the vehicles are likely to be in the requisite vicinity of each other)

In a simple comparison process, where the drivers of two vehicles have both indicated their willingness or possible intention to attend an event, the movement profile comprises just basic data relating to the event—so the event name or a specific identifier designated with the event. The comparison may therefore compare the name of the event (or identifiers of an event), and if suitable match is found with respect to two vehicles, then scheduling time can be provided appropriately, which may be the relevant times of the event. The date and place of the event is inherent and so the comparison merely confirms or not that the vehicles are likely to attend the same event. Thus the time of the event (which can is determined from various information) be designated as scheduling time for data transfer. In this case, the geographical information does not need to be even known. Processing movement profiles in this example is merely a simple matching process.

Where the profile data comprises a planned or putative appointment at a non-geographical location at a certain time or time span, the geographical location can be deduced as the movement profile data gives the name of the place (Cedar Dental Practice). The geographical information can be determined from the place name from various sources e.g. address books, Google maps and such like.

The comparison can compare the pre-planned time and geographical location with the movement profiles of other vehicles. If for example the movement profile of another vehicle indicates that the other vehicle is likely to be in the vicinity of the pre-planned location at a similar or overlapping times, then payload data can be scheduled for transfer at such time(s) from the vehicle which has the payload data to the vehicle which does not.

So the movement profile of vehicle A may include appointment type data indicating a dental appointment at Cedar Dental Practice on Tuesday 29 June at 12.30-1 pm. It may that vehicle B has movement profile which indicates that it is likely to be (park) at a railway station car park during all weekdays from 7 am to 6 pm. If Cedar Dental Practice is located is close (sufficient proximity) to the station, movement profiles are processed (e.g. in this case compared) such as to determine that the geographical locations and times with respect to vehicles A and B) coincide in that there is effectively an overlap of both time and location; so payload data transfer may be scheduled during the dental appointment. So generally if the people associated with vehicles have appointments at close locations with similar or overlapping times, then again scheduling of payload data transfer at such times can be determined. It is to be noted that the movement profiles of two vehicles do not necessarily have to be of the same type, and differing forms and types of movement profiles of two vehicles may be processed in conjunction to determine scheduling times.

As mentioned movement profiles can be analysed to determine temporal patterns in location, e.g. to determine the likely chance that the vehicle will be at a vicinity at a future time, and this compared with movement profiles of other vehicles to determine matches.

In one particular embodiment, e.g. where movement profile data comprises raw data such as geographical locations and times, e.g. time stamped locations, the methodology derives i.e. computes the distance between vehicles over time. So the distance between two particular vehicles can be plotted/formulated with time. Patterns in the plot of distance between the two vehicles can then be deduced so as to formulate scheduling times for payload data transfer. So for example for each pair of vehicles, a distance table or chart comprising the distance between them over time is formulated, and analysed to determine likely scheduling times where the vehicles are in requisite proximity. So the process may look for temporal patterns of the plot of the distance between the vehicles; e.g. look at times when the distance between the two vehicles drops below, e.g. a threshold value sufficient for data transfer (within wireless proximity). This may occur at regular or predictable times; i.e. sufficient proximity may occur at particular/regular times (e.g. time of day/days of week or month) and used to determine the optimum scheduling times. The patterns detected may be combinations of temporal values/parameters e.g. every Tuesday at 20.00 pm (where persons associated with two vehicles may attend the same exercise class at a sports centre).

According to aspects the scheduling data may be provided also with probability data, for example tables may be provided with possible scheduling times and an associated probability at each of these times, that the vehicles will be in requisite proximity.

Figure 3:
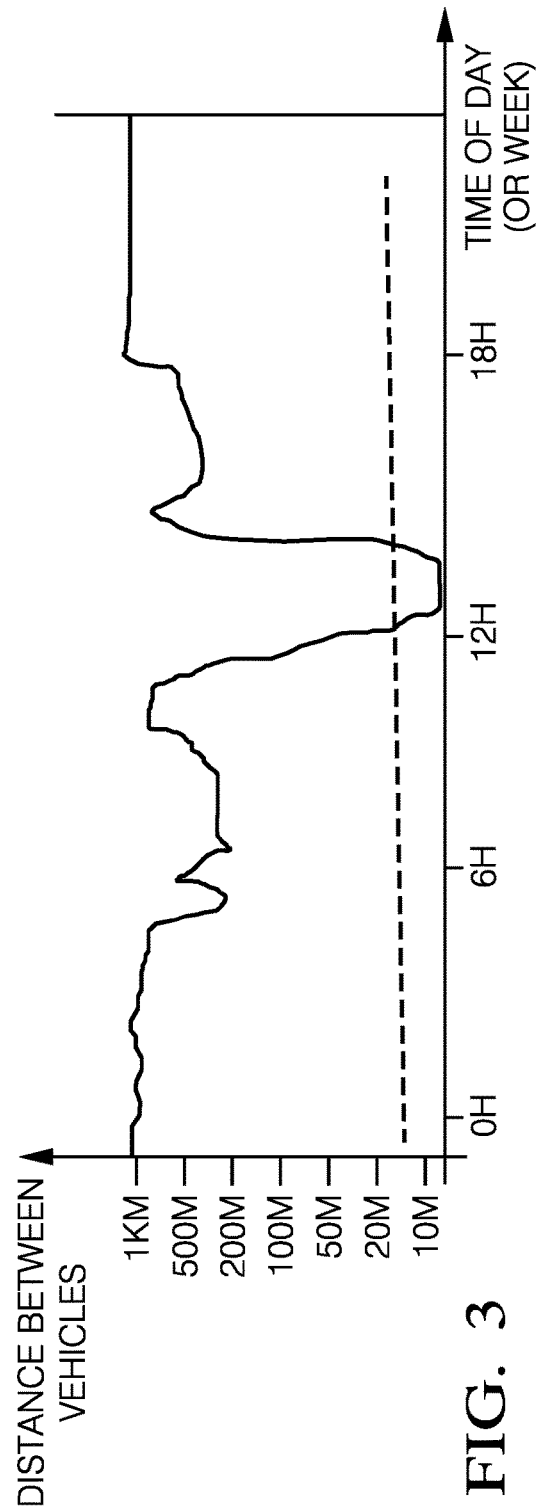
FIG. 3 illustrates an example of the methodology according to one example above and shows the spatial distance between two vehicles over a time period.

FIG. 3 illustrates an example of the above and shows the distance between two vehicles over a time period of 24 hours. The distance between the vehicles can be calculated from individual movement profiles of the vehicles so e.g. from vehicle position at particular times (e.g. time intervals). This distance data may be formulated over a single time period (e.g. 24 hours) or averaged over previous similar/corresponding time (e.g. 24 hour) periods (e.g. with respect to the same time of day). So in other words, in an example, a 24 hour profile starting at the same time of day may be averaged for more than one similar 24 hour period. Alternatively the distance profile may be formulated from data of distances on a Monday Tuesday Wednesday Thursday and Friday to give an indication of the average pattern i.e. in this case separation distance) likely at a particular time on any working day of the week.

Returning to FIG. 3, it shows that the distance between two vehicles around 13.00 hours each day (or an average day) is minimal (within a range threshold marked by the dashed line) and the system may conclude that around this time is the best time for data to be transferred; i.e. to schedule a time slot for transfer of payload data from one vehicle to another. It may be that the vehicles parked up at the same café/shopping centre during lunch hour. The system will then decide to schedule data transfer during this time. According to methodology, there may be one or more thresholds to determine when the vehicles are likely to be within a certain distance.

The distance table may contain few discrete levels of distance or instead of continuous values to determine if a transmission range is reached with respect to the vehicles transceiver capability. The data transfer jobs may be created by an operator e.g. to push an e.g. a large software update to a specific vehicle. So for a data transfer job, the distance tables can be filtered to find direct meeting slots (with a reasonable probability value) between the vehicles.

It is to be noted that the timespan is 24 hours in the example; however the timespan may be any length and made up from one or more similar regular or different timespans.

Furthermore the timespan may be divided into further time periods and used to detect patterns. So if the overall timespan is a week, and if the driver of a vehicle only works three days per week, regularly on Monday Tuesday and Wednesday, and parks in the same station car park, then this pattern is detected (e.g. with reference to another vehicle or a location on its own). So the movement profile of a single vehicle can be used to determine patterns of distances from a particular location, or alternatively the movement profiles of two vehicles correlated to identify temporal patterns and predict likely (overlapping) scheduling times where both vehicles are likely to be in sufficient proximity.

Further Methodology

Figure 4:
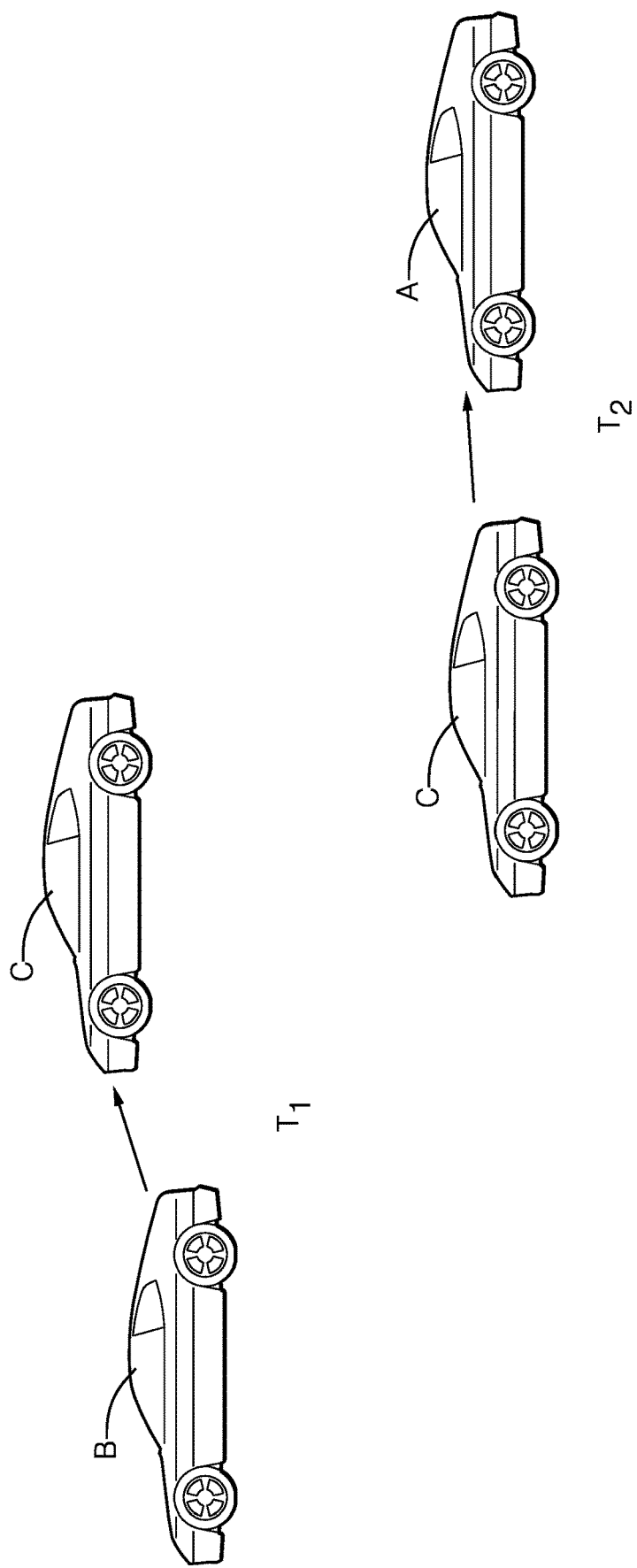
FIG. 4 shows an example of the methodology which provide for data transfer from a vehicle to another vehicle via a further vehicle.

It may be that a vehicle A in need of data which is possessed by vehicle B rarely comes into proximity with each other, In aspects of the methodology data can be transferred via one or more intermediate vehicles (e.g. vehicle C). Thus the system according to aspects provide for "hopping" of data. In such examples, the movement profile of vehicle A can be analyzed to see if an appropriate one or more intermediate vehicles are likely to come into proximity with both vehicle A and B; in this way data can be transferred from vehicle B to vehicle A via vehicle C. In an example, it may be found that comparing movement profiles of vehicle A and C means they it is likely they will come into proximity at certain times and similarly comparing movement profiles of vehicle B and C means they are likely to come into proximity at certain times. As a result data transfer can be scheduled from vehicle B to vehicle C at one time (location) and then data further retransferred via this hop to vehicle A at another timeslot (location). This is illustrated shown in FIG. 4 where a match is determined between vehicle B and vehicle C where at time T1 when from their movement profiles they will be in requisite proximity and further a later match is determined between vehicle B and vehicle A from their respective movement profiles at (scheduling) later time slot T2 when they are likely to be in requisite proximity. So where payload data cannot be transferred from vehicle B to vehicle A because they are unlikely to ever or within the requisite time frame be in the requite proximity for information data transfer, such information data can be transferred via vehicle C.

Example Scenario: A first vehicle of a first manufacturer needs a software update in the infotainment system including a navigation map update of several GByte of data, but it has no broadband internet access. The method's analysis of the profiles shows a data migration path by using a second vehicle of a different manufacturer that could receive the needed data package from vehicle V3 of manufacturer OEM1 that already got the software and map update. According the generated tasks by the method, the vehicle V2 receives the data from V3 at night as they park regularly in range of each other as owners are neighbors. Next day the V1 receives the data from V2 at day as they park regularly in range of each other as owners are working in the same company and use the company parking area. A billing for this service can take place from OEM2 to OEM1 for that data transportation service. As using the pre-arranged exchanges and deep sleep modes, no recognizable influence and minimized risk is applied to the vehicles infrastructure or battery. In such methodology all vehicles can be considered to find match and the hopping transfer of data may form a chain of any length i.e. via any number of (?) vehicles.

Figure 5:
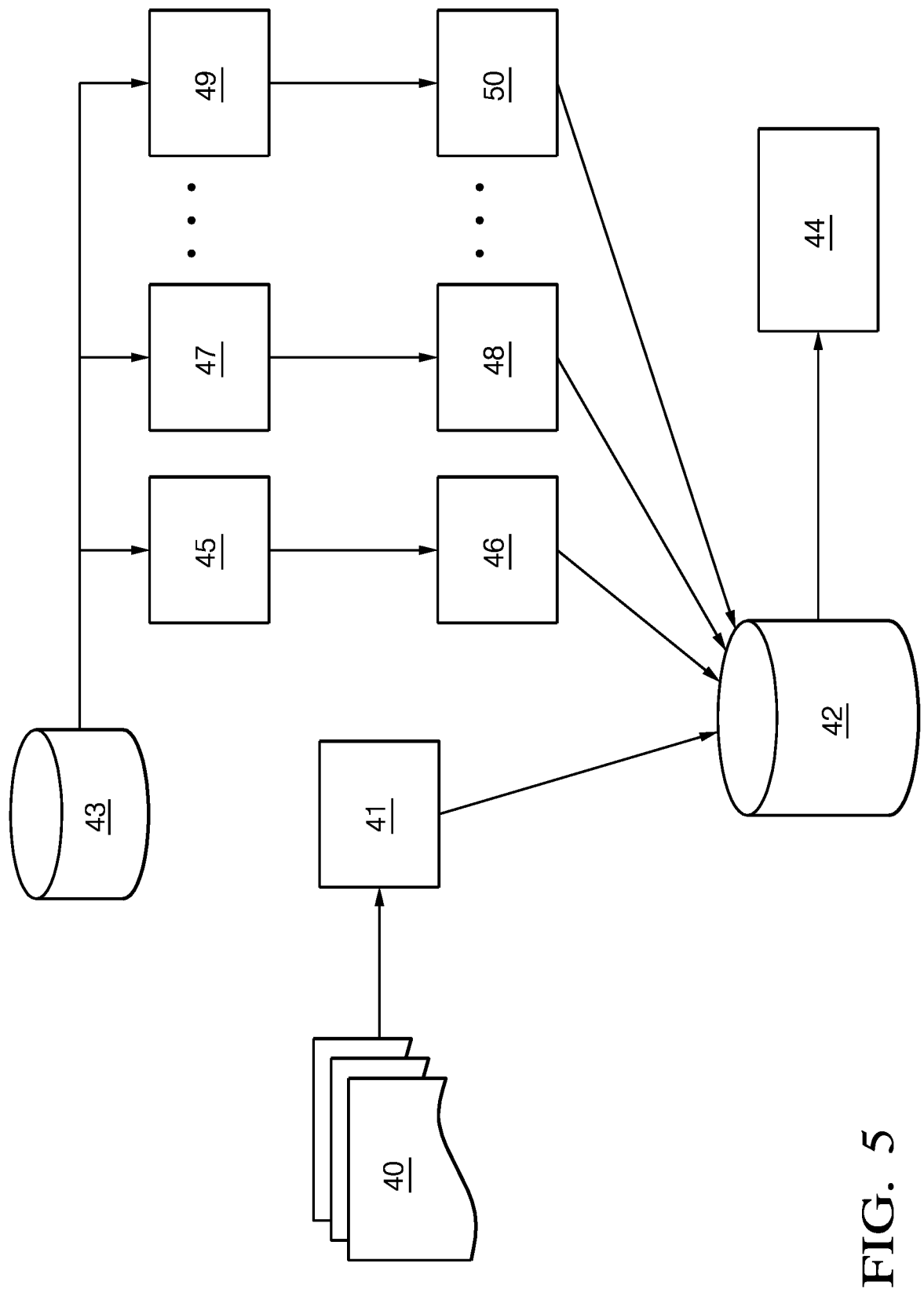
FIG. 5 which show functionality of a method according to one example.

A method is illustrated in FIG. 5 which show functionality. As input is a list of payload data transfer jobs 40 to be executed. Box 41 shows a filter/processing function where direct meetings (zero hop), time schedules, (i.e. zero hop) are determined from movement profiles e.g. from a distance tables of box 43. The filter/processor determines jobs and forwards data with respect to these to a data migration job scheduler/storage 42 which schedules potential data transfer between two vehicles which includes partial transfers. Such data may also indicate the payload data to be transferred. The scheduler arranges scheduling times with respect to the jobs and transfers this and other data (such as wake up times) to the relevant nodes in box 44. An input to the filter/processor 41 is from a distance table 43 (or movement profiles). From the distance table or movement profile storage 43, data is input to box where all intermediate nodes (which may include any component but generally will be vehicles or fixed nodes or fixed personal devices) vehicles are found. The output of box 45 is to box 46 which is a filter processor to determine data transfer jobs with one hop i.e. one intermediate node. These jobs are stored/processed in 42 where e.g. scheduling times and any other appropriate data are sent to all relevant nodes. Similarly, all 2-hop links are determined in box 48 from distance tables/movement profiles and are filtered/processed at step 48 to provide all 2-hop data transfer jobs in 42; which as before, sends out scheduling and other data. This can be done in corresponding fashion for any number n hop links (see boxes 49 and 50). As mentioned all scheduling jobs are concluded by 42 which forwards the job data to the relevant components e.g. fixed nodes; vehicles or personal devices associated with the determined pathway for data transfer.

The filters can select the probable meeting slots according to transfer urgency and cost. A filtered direct meeting will result in a single transfer time send to two vehicles (source and sink), a 1-hop meeting will result in two transfer times, the 1st sends to source and the transfer node (hop) and the 2nd time to the transfer node (hop) and the sink node. And so on. To increase the meeting probability, each partial transfer job can be repeated some times. A scheduling/wake-up time included with the payload transfer job may cause causes the vehicle systems wake up and try to obtain a wireless link with the other vehicle i.e. the scheduled time. To increase the overall successful transfer probability, the method may generate parallel migration paths utilizing different slots and/or different intermediate hops.

A feedback mechanism on successful or unsuccessful job execution may be used to cancel parallel transfer jobs or to initiate new transfer jobs. The data manager of each node will release (or tag for release) the used memory as soon as the transfer if complete to enable other task storage again.

Other Miscellaneous Features

Other features that can be incorporated in the system are security mechanisms/features and the use of and security keys. The system may have functionality to check the data integrity of data packets with known methods (Hashes & Signatures). The system may use known algorithms. The system may accepts payload data according to the tasks as well as collects and fulfills payload data according to the tasks, and deliver payload data according to the tasks.

In aspects the systems collects wireless contact data and derives profiles hereof to coordinate a pre-arrangement with communication partners. The system may be adapted to share derived profile data with the central remote entity to improve the pre-arrangement of payload data transfer by central/remote entity based planning of scheduling times. Components of the system may be arranged to wake up autonomously within the scheduled times e.g. expectation horizon and seek the communication partner (other vehicles) to exchange data. So the system may pre-arrange meetings with communication partners for data exchange, e.g. locations with wakeup/seek schedules or accept paid tasks from 3rd parties from the cloud.

The system may uses a cloud service to load or upload tasks, meeting schedules and movement profiles of potential vehicles (with respect to sources or sink vehicles in terms of payload data). The systems may wait for communication partners in an low power mode, e.g. BT-LE and switch to normal power as soon as the partner is stable and in range for data exchange. The system may collect the full data packet in one single piece or share it in multiple separate parts (e.g. BitTorrent), either time partial or location partial. The system may create a route suggestion or a deviation or a special moving schedule for autonomous driving vehicles to arrange a meeting with an appropriate communication partner, utilizing an empty return drive of such a vehicle.

So aspects provide for a method of pre-arranged data communication events between at least two mobile computer systems in vehicles, using mobility profiles to derive an operation schedule. The schedule may comprise commands for controlling each vehicles systems operation such as wakeup times, partner identification, communication strategy and sleep times. The calculated operation schedule can be optimized for efficiency and least energy consumption of the participating computer systems. The calculated operation schedule methodology may consider the individual data storage capability the each involved computer system. The calculated operation schedule considers the individual battery status and capability the each involved computer system to stay within allowed energy budget for data transfer tasks.

I claim:

1. A method for determining a time for scheduling wireless transfer of payload data to a first vehicle from a second vehicle, said method comprising:
   determining payload data for transfer from a second vehicle to a first vehicle;
   receiving first movement profile data for the first vehicle, the first movement profile data defining geographical position and time data for the first vehicle;
   receiving second movement profile data for the second vehicle, the second movement profile data defining geographical position and time data for the second vehicle;
   processing the first and second movement profile data to determine a scheduling time when the first vehicle and the second vehicle will be in requisite wireless proximity for a payload-data-transfer; and
   sending scheduling data to the first vehicle and the second vehicle scheduling a transmission of the payload data from the second vehicle to the first vehicle at the scheduling time.

2. The method as claimed in claim 1, wherein processing the first and second movement profile data to determine a scheduling time when the first vehicle and the second vehicle will be in requisite wireless proximity for the payload-data-transfer comprises processing said first and second movement profiles in conjunction with one another.

3. The method as claimed in claim 1, further comprising:
   selecting the second vehicle, wherein said second vehicle is selected by comparing second movement profile data for a plurality of vehicles possessing said payload data with the first movement profile data for said first vehicle, and concluding a match between said first vehicle and second vehicle, said match being the result of processing the first and second movement profile data to determine a scheduling time when the first vehicle and the second vehicle will be in requisite wireless proximity for the payload-data-transfer in that it is determined in that second vehicle is likely to be in sufficient wireless proximity with said first vehicle at one or more future times.

4. The method as claimed in claim 1, wherein receiving first movement profile data for the first vehicle further comprises:
   receiving first movement profile data derived from a GNSS/GPS system of the first vehicle.

5. The method as claimed in claim 1, wherein receiving second movement profile data for the second vehicle further comprises:
   receiving second movement profile data derived from a GNSS/GPS system of the second vehicle.

6. The method as claimed in claim 1, wherein at least one of the first movement profile data or the second movement profile data includes one or more scheduled or possible attendance at events or appointments.

7. The method as claimed in claim 6 where at least one of the first movement profile data or the second movement profile data defines an event name or identifier.

8. The method as claimed in claim 1, wherein at least one of the first historical movement profile data or the second movement profile data defines an appointment location and time.

9. The method as claimed in claim 1, wherein at least one of the first movement profile data or the second movement profile data of is derived from an electronic calendar or diary.

10. The method as claimed in claim 1, wherein at least one of the first movement profile data or the second movement profile data is derived from a social media or forum website accessed by a person associated with the relevant vehicle.

11. The method as claimed in claim 1, wherein at least one of the first movement profile data or the second movement profile data is derived from or via a personal device associated with a person associated with the relevant vehicle.

12. The method as claimed in claim 1, wherein processing the first and second movement profile data to determine a scheduling time when the first vehicle and the second vehicle will be in requisite wireless proximity for the payload-data-transfer comprises:
   determining temporal patterns of one or more of the first and second movement profile data.

13. The method as claimed in claim 1, wherein processing the first and second movement profile data to determine a scheduling time when the first vehicle and the second vehicle will be in requisite wireless proximity for the payload-data-transfer further comprises:
   determining, from said first and second movement profile data, distance between the two first and second vehicles against time, and wherein scheduling a transmission of the payload data at the scheduling time comprises determining likely times where said distance is at a minimum or within sufficient wireless proximity.

14. The method as claimed in claim 13 wherein processing the first and second movement profile data to determine a scheduling time when the first vehicle and the second vehicle will be in requisite wireless proximity for the payload-data-transfer comprises:
   determining temporal patterns in the distance between the first and second vehicles against time.

15. The method as claimed in claim 1, wherein at least one of the first movement profile data or the second movement profile data is forwarded to a central or remote entity, wherein processing the first and second movement profile data to determine a scheduling time when the first vehicle and the second vehicle will be in requisite wireless proximity for the payload-data-transfer is performed by the entity, and wherein scheduling a transmission of the payload data at the scheduling time is performed by the entity.

16. The method as claimed in claim 1, wherein at least one of said scheduling time, said first movement profile data, or said second movement profile data are sent or received by at least one of said vehicles, via a personal device associated with a person associated with said vehicle.

17. The method as claimed in claim 1, further comprising:
processing the first and second movement profile data to provide refined movement profile data.

18. The method of claim 1, further comprising:
initiating the transmission of the payload data at the scheduling time.

19. The method of claim 1, wherein processing the first and second movement profile data to determine a scheduling time when the first vehicle and the second vehicle will be in requisite wireless proximity for the payload-data-transfer comprises:
comparing the first movement profile data and the second movement profile data.

20. The method as claimed in claim 1, wherein scheduling a transmission of the payload data at the scheduling time comprises:
determining times where said distance is at a minimum or within sufficient wireless proximity.

21. The method as claimed in claim 20 wherein processing the first and second movement profile data to determine a scheduling time when the first vehicle and the second vehicle will be in requisite wireless proximity for the payload-data-transfer comprises:
determining temporal patterns in the distance between the first and second vehicles against time.

* * * * *